(12) United States Patent  
Ruedi et al.

(10) Patent No.: US 8,708,426 B2  
(45) Date of Patent: Apr. 29, 2014

(54) WHEEL BEARING FOR A UTILITY VEHICLE

(75) Inventors: Carlos Ruedi, Sorocaba (BR); Alexandre Camilo, Votorantim (BR); Osmar de Matos, Sao Paulo (BR); Marco Aurelio Graciano, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/478,521

(22) Filed: May 23, 2012

(65) Prior Publication Data

US 2013/0313799 A1   Nov. 28, 2013

(30) Foreign Application Priority Data

May 23, 2011 (DE) .......................... 10 2011 076 275

(51) Int. Cl.  
*B60B 27/02* (2006.01)

(52) U.S. Cl.  
USPC ....................... 301/105.1; 301/110; 301/108.4

(58) Field of Classification Search  
USPC .......... 280/105; 301/105.1, 109, 110, 111.01, 301/112, 111.02, 111.03, 111.04, 111.05, 301/108.4; 29/894.36, 525.11; 411/209, 411/236, 239

See application file for complete search history.

(56) References Cited

U.S. PATENT DOCUMENTS

| 4,498,709 | A  | * | 2/1985  | Wells et al. ................... 301/5.24 |
|-----------|----|---|---------|------------------------------------------|
| 5,080,156 | A  | * | 1/1992  | Bartos ........................... 152/417 |
| 5,772,373 | A  | * | 6/1998  | Cronin et al. ................... 411/120 |
| 6,719,028 | B2 | * | 4/2004  | D'Amico et al. .............. 152/415 |
| 6,935,788 | B2 | * | 8/2005  | Stanczak ....................... 384/551 |
| 8,092,132 | B2 | * | 1/2012  | Zink et al. ...................... 411/221 |
| 2008/0024003 | A1 | * | 1/2008 | White et al. ................... 301/108.4 |
| 2009/0051214 | A1 | * | 2/2009 | Gradu et al. ................... 301/137 |
| 2010/0301665 | A1 | * | 12/2010 | White et al. ................... 301/105.1 |
| 2010/0320832 | A1 | * | 12/2010 | Weigand et al. .............. 301/110 |
| 2011/0291468 | A1 | * | 12/2011 | Rieger et al. ................. 301/105.1 |
| 2011/0316325 | A1 | * | 12/2011 | Martin et al. ............... 301/105.1 |
| 2012/0104837 | A1 | * | 5/2012  | Drewes ......................... 301/109 |

\* cited by examiner

*Primary Examiner* — Karen Beck  
(74) *Attorney, Agent, or Firm* — Simpson & Simpson, PLLC

(57) ABSTRACT

The invention relates to wheel bearing that is intended for a utility vehicle and includes a sleeve-shaped carrier shaft, in which an axle of the utility vehicle can be received in a concentric manner; a wheel hub; and a first roller bearing and a second roller bearing for rolling the wheel hub relative to the carrier shaft. In this case the second roller bearing is clamped axially against the first roller bearing on the sleeve-shaped carrier shaft by means of a press ring.

2 Claims, 7 Drawing Sheets

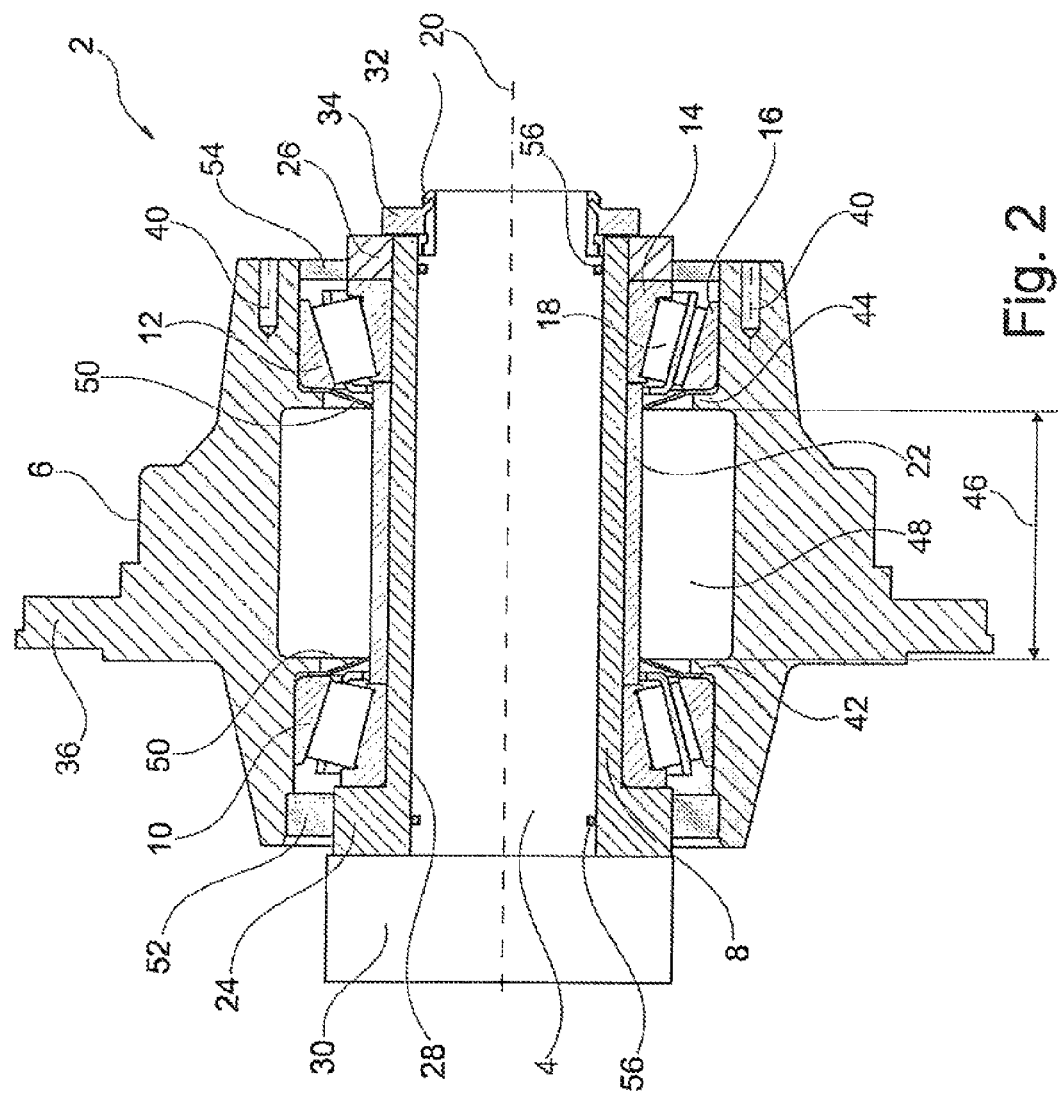

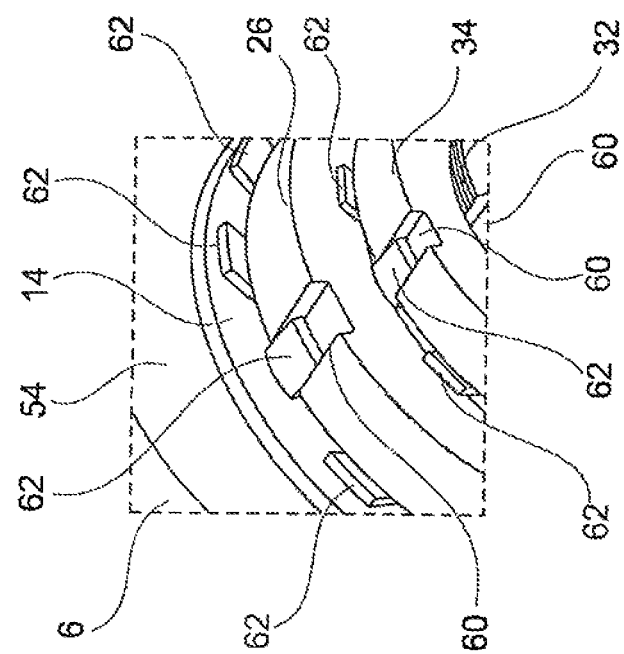
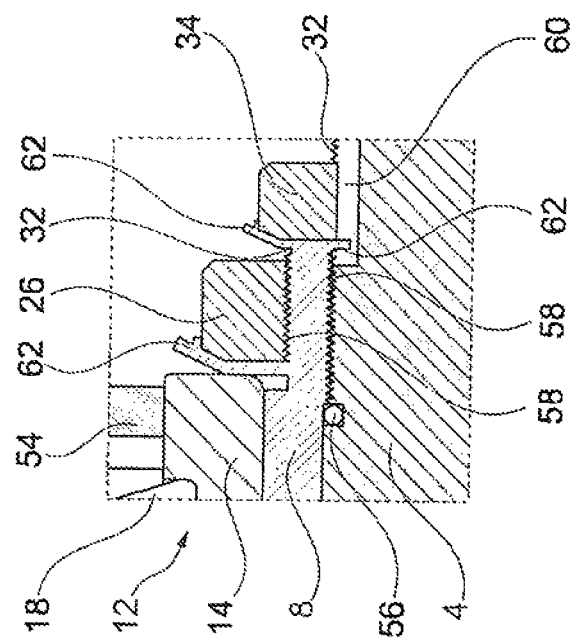

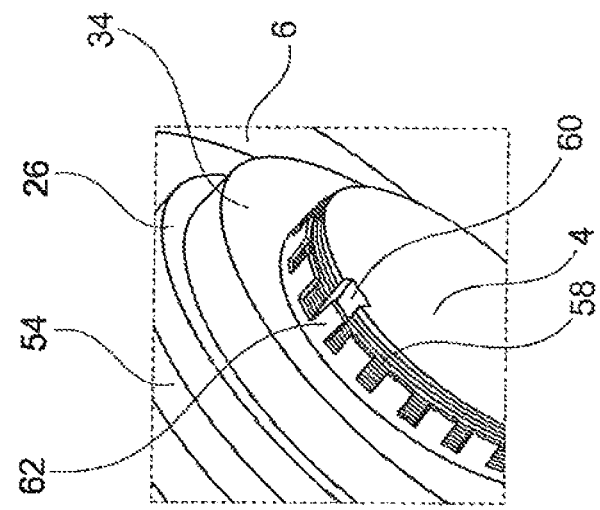
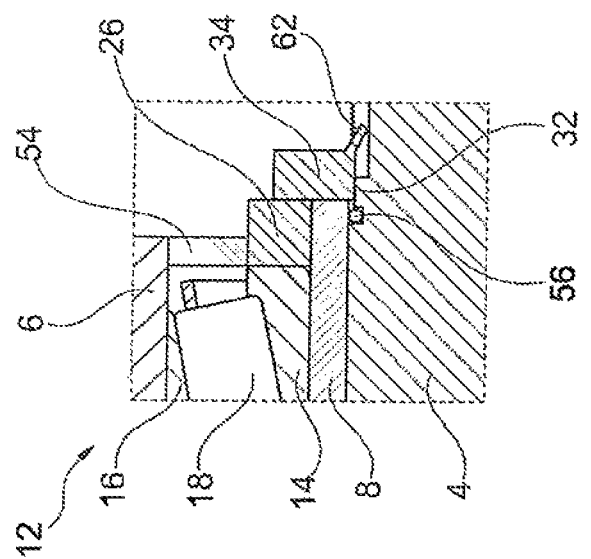

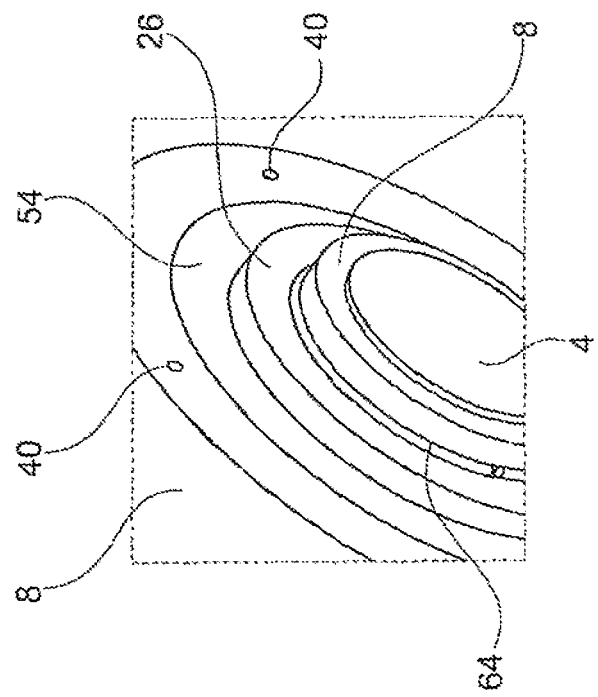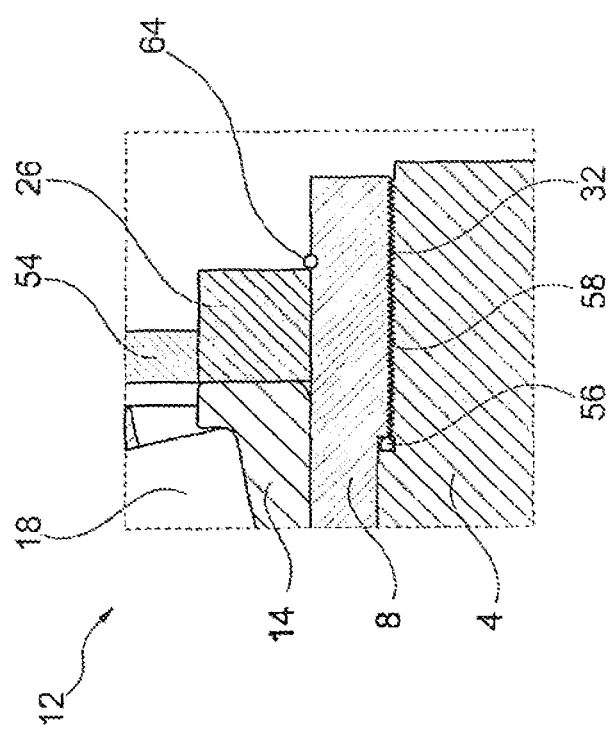

WHEEL BEARING FOR A UTILITY VEHICLE

CROSS-REFERENCE TO RELATED APPLICATIONS

This patent claims priority from German Patent Application No. DE 10 2011 076 275.2, filed May 23, 2011, which application is incorporated herein by reference in its entirety.

FIELD OF THE INVENTION

The invention relates to a wheel bearing for a utility vehicle, the utility vehicle, and a method for manufacturing a wheel bearing for a utility vehicle.

BACKGROUND OF THE INVENTION

Wheel bearings are mounted in the center of a wheel and are used in vehicles to attach the wheel to the vehicle frame in such a way that the wheel can be rotated. The wheel bearing separates the rotatable components on the vehicle, like the wheel hub, from the stationary components on the vehicle, like the wheel suspension. The wheel bearing guides the forces and the moments from the road to the vehicle body and vice versa.

BRIEF SUMMARY OF THE INVENTION

One object of the present invention is to provide an improved wheel bearing for a vehicle.

The invention proposes to equip a wheel bearing of the type described in the introductory part with a carrier shaft, in which the axle of the vehicle can be received in a concentric manner. The actual roller bearings of the wheel bearing are mounted on the carrier shaft and axially clamped relative to each other by means of a press ring.

The invention is based on the consideration that a wheel bearing could be made of two individual roller bearings, such as tapered roller bearings, that could be radially arranged between an axle and a wheel hub of the vehicle in such a way that the roller bearings can be axially spaced apart from each other. However, this design requires that the roller bearings be re-greased at frequent intervals, usually after 40,000 km. In addition, the roller bearings are subject to more soiling and a higher rate of wear, disadvantages that become apparent, for example, due to an increase in the fuel consumption. In addition, it is often the case that under normal operating conditions there is a higher loss of lubricant, a feature that is associated with a maintenance and service requirement for re-greasing the roller bearings. Finally such wheel bearings do not allow the pre-stress to be adjusted for purposes of reducing the axial play and holding the pre-stress at a specified value over a longer service life. Pre-stress in this context is defined as a force, with which the outer rings of the individual roller bearings are pushed axially against the inner rings of the roller bearings, so that the roller elements are clamped axially between the outer rings and the inner rings.

In contrast, the wheel bearing could also be manufactured as a closed unit. In this case, the individual wheel bearing elements, like the roller elements, the lubricant and the wheel hub, are connected together, from the beginning, for the entire service life of the wheel bearing. These wheel bearings are known, for example, by the names: insert bearings, 1T Generation wheel bearings, trailer axle module (TAM) or front axle module (VAM). However, the manufacture of such wheel bearings can be as much as 150% more expensive than the manufacture of the first mentioned wheel bearing variants.

The invention is based on the idea that a wheel bearing that is manufactured as a closed unit can also be made of two individual roller bearings. This feature is achieved by the aforementioned carrier shaft, on which the two roller bearings are axially clamped.

Therefore, the invention provides a wheel bearing that is intended for a utility vehicle and that includes a sleeve-shaped carrier shaft, in which an axle of the utility vehicle can be received in a concentric manner; a wheel hub; a first roller bearing and a second roller bearing for rolling the wheel hub relative to the carrier shaft. At the same time the second roller bearing is clamped axially against the first roller bearing on the sleeve-shaped carrier shaft by means of a press ring.

Owing to the carrier shaft and the roller bearings, which are axially clamped on the carrier shaft, all of the elements of a wheel bearing can be prefabricated at a low cost and can be installed in the utility vehicle. In contrast to the wheel bearing designed as a unit, the individual elements of the proposed wheel bearing can be exchanged, for example, for maintenance purposes, when the proposed wheel bearing fails, for example, due to overload phenomena. This exchange does not have to be performed on the utility vehicle itself, but rather can be done after the entire wheel bearing has been removed in an environment that is provided for this purpose, such as on a work bench. If the proposed wheel bearing is exchanged for a new wheel bearing, at least those components of the damaged wheel bearing that are still functional can be re-used. Therefore, the proposed wheel bearing can not only lower the maintenance costs of a wheel bearing, but also its design as a functional unit allows the proposed wheel bearing to be installed with little technical effort, even though the individual components of the wheel bearing can be exchanged at a later date (like the roller bearing) or can be replaced (like the lubricant).

In order to axially clamp the roller bearings on the carrier shaft, the press ring should be secured against axial movements on the carrier shaft. This axial securing can be carried out in any way. Hence, the press ring can be axially secured, for example, in a force closed manner (for example, a press fit) or by material bonding (for example, by laser welding). It is especially preferred that the proposed wheel bearing has a retaining element that prevents the press ring from moving axially in a direction opposite the second roller bearing.

In one embodiment, the retaining element includes an end stop that is arranged on the carrier shaft on an axial side of the press ring that lies opposite the second roller bearing. This end stop can be designed in any conceivable way. Hence, the end stop can be a gap that runs radially through the carrier shaft and the axle of the vehicle that is received in the carrier shaft. As an alternative, the end stop can also be a nut that can be screwed on the carrier shaft. However, it is especially preferred that the end stop be a snap ring that is clamped around the carrier shaft, because the snap ring is easy to remove by mechanical means, in the event that the wheel bearing has to be disassembled for maintenance purposes or other reasons.

In another embodiment, the retaining element can also be mounted in a positive locking manner on the carrier shaft, so that the positive locking fit has to absorb the axial forces. The positive locking fit can be formed, for example, by means of projections that project radially inwards from the press ring and that can be inserted into corresponding radial recesses on the carrier shaft. It is highly preferred that the positive locking fit be produced by an internal thread on the retaining element and/or on the press ring. This internal thread is formed on an inside circumference of the press ring and can be screwed on an external thread on the outside circumference of the carrier shaft. In this case the external thread is arranged on an axial side of the second roller bearing that lies opposite the first roller bearing.

It is especially preferred that the retaining element has an anti-rotational element, with which the internal thread can be secured in a defined angular position on the external thread.

Although the first roller bearing can be secured on the carrier shaft in such a way that an inner ring of the roller bearing cannot be rotated relative to the carrier shaft, the proposed wheel bearing includes, in another embodiment, an additional axial end stop for axially abutting the first roller bearing on the carrier shaft. This axial end stop makes it easy to push the two roller bearings onto the carrier shaft and to clamp them together by means of a cold formed collar.

In yet another embodiment, the proposed wheel bearing includes a spacer sleeve that is fitted concentrically on the carrier shaft and that is disposed axially between an inner ring of the first roller bearing and an inner ring of the second roller bearing and that transfers at least some of the tensioning force from the second roller bearing to the first roller bearing. The spacer sleeve makes it possible to clamp the inner rings of the two roller bearings firmly together in the axial direction and, in so doing, to secure them to the carrier shaft of the proposed wheel bearing. The pre-stress of the two roller bearings can be not only defined with exact precision by means of the spacer sleeve, but also preserved on a permanent basis, because a major portion of the axial force, holding the roller bearings on the carrier sleeve, can be absorbed by the spacer sleeve. In this case the outer rings of the roller bearings make axial contact and, in so doing, enable a pre-stress only to the extent it is allowed by the axial expansion of the spacer sleeve.

In another embodiment, the wheel hub of the proposed wheel bearing has a radially inwards pointing projection that engages axially between an outer ring of the first roller bearing and an outer ring of the second roller bearing. The axial expansion of this projection enables a precision adjustment of the pre-stress in the two roller bearings.

The roller bearings can be, for example, ball bearings. The roller bearings are preferably tapered roller bearings with a taper that absorbs, as the roller body, the resulting forces in a distributed manner on their tapered surface and, as a result, are extremely resistant to mechanical stress.

The tapers of the tapered roller bearings can be configured in the shape of an O or in a tandem arrangement. It is highly preferred that the tapers of the tapered roller bearings be configured in the shape of an X, so that the taper points merge in the direction of the axis of rotation of the bearing.

The invention also proposes a utility vehicle that has a frame with a rigid axle, a wheel, and a proposed wheel bearing for mounting the wheel on the rigid axle.

In yet another embodiment, the carrier shaft is axially secured on the axle of the utility vehicle by means of a securing element that protrudes at least partially radially over the press ring. The protruding securing element can axially secure, if desired, the press ring, when the conditions for an axial mounting of the press ring itself on the carrier shaft are no longer met.

The invention also proposes a method for manufacturing a wheel bearing for a utility vehicle, having the steps of axially mounting a first roller bearing on a sleeve-shaped carrier shaft, in which an axle of the utility vehicle can be received in a concentric manner; radially mounting a wheel hub on the first roller bearing, so that a radial gap is formed between the carrier shaft and the wheel hub; inserting a second roller bearing into the radial gap; and clamping the second roller bearing on the sleeve-shaped carrier shaft against the first roller bearing by pushing a press ring onto the carrier shaft against the second roller bearing. At the same time the steps of axially mounting the first roller bearing on the sleeve-shaped carrier shaft and radially mounting the wheel hub on the first roller bearing can be carried out in any order of sequence.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which:

FIG. 2 is a cross-sectional view of the wheel bearing of FIG. 1;

FIG. 3a is a cross-sectional view of an exemplary press ring of FIG. 1;

FIG. 3b is a perspective view of the press ring of FIG. 3a;

FIG. 4b is a perspective view of the press ring of FIG. 4a;

FIG. 5a is a cross-sectional view of another embodiment of the press ring of FIG. 1;

FIG. 5b is a perspective view of the press ring of FIG. 5a;

FIG. 6a is a cross-sectional view of another embodiment of the press ring of FIG. 1;

FIG. 6b is a perspective view of the press ring of FIG. 6a;

FIG. 7a is a cross-sectional view of another embodiment of the press ring from FIG. 1; and, FIG. 7b is a perspective view of the press ring of FIG. 7a.

DETAILED DESCRIPTION OF THE INVENTION

Figure 1:
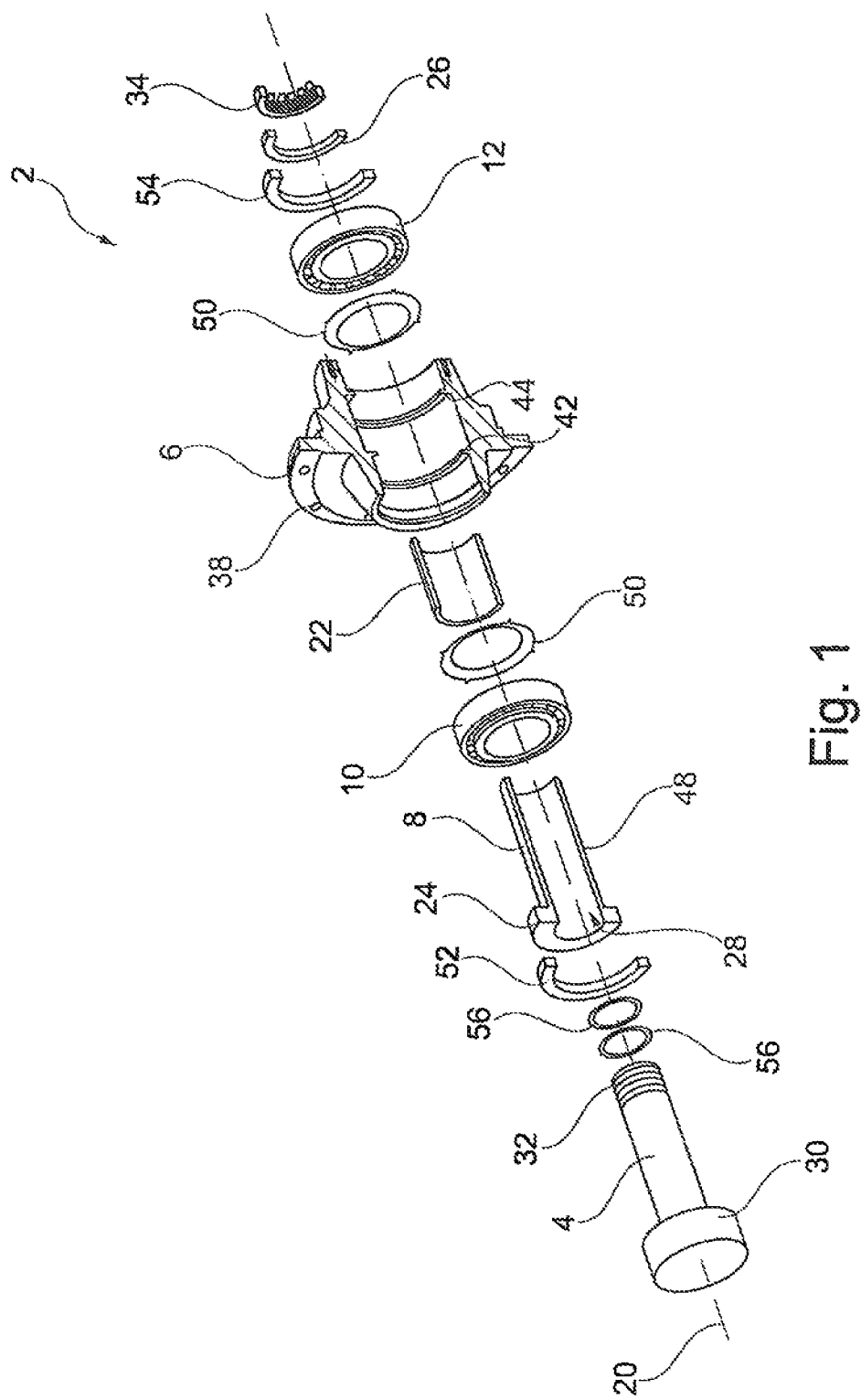
FIG. 1 is an exploded view of a wheel bearing mounted on the axle.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Identical elements are provided with the same reference numerals in the figures and are described only once.

Referring to FIGS. 1 and 2, wheel bearing 2 is shown on axle 4 of a vehicle that is not depicted in detail.

Axle 4 is rigid axle 4 in the present embodiment. In rigid axle 4 wheel hub 6 (to be described in detail below) of wheel bearing 2 can be disposed in such a way that it can be rotated about the rigid axle body of rigid axle 4. Rigid axles are generally used in utility vehicles and in less frequent cases in passenger vehicles, where an independent wheel suspension is typically used, due to their simple and rugged design. In contrast to rigid axle 4, the wheel hub in an independent wheel suspension is connected in a rotationally rigid manner to the vehicle frame.

Wheel bearing 2 includes wheel hub 6, which can be arranged in a rotatable manner on carrier shaft 8. At the same time, wheel hub 6 is mounted in a rotatable manner on carrier shaft 8 by means of inner roller bearing 10 and outer roller bearing 12. In this case, inner roller bearing 10 is the roller bearing that is disposed on the vehicle side in the mounted state on rigid axle 4, whereas outer roller bearing 12 in the mounted state on rigid axle 4 is arranged on the side of wheel bearing 2 that faces away from the vehicle.

Each roller bearing 10, 12 has inner ring 14 and outer ring 16, which is mounted so as to be rotatable relative to inner ring 14. Between inner ring 14 and outer ring 16 there are roller bodies 18 in the form of tapered rollers 18, over which inner ring 14 can roll relative to outer ring 16. For the sake of a better overview only one of tapered rollers 18, disposed between inner rings 14 and outer rings 16 of two roller bearings 10, 12, is provided with a reference numeral in FIGS. 1 and 2. Tapered rollers 18 are highly preferred as the roller bodies in utility vehicles, because they have a larger surface compared to spherical roller bodies, so that these larger surfaces can absorb the loads between the utility vehicle and the road surface. In principle, however, any type of roller body can be used depending on the vehicle, in which wheel bearing 2 is used. Furthermore, tapered rollers 18 in the present embodiment are configured in the shape of an X, which means that the points of tapered rollers 18 are directed towards each other and in the direction of rotational axis 20 of wheel bearing 2. Furthermore, tapered rollers 18 can be arranged either in the shape of an O, where the points of tapered rollers 18 are directed towards each other and away from rotational axis 20 of the wheel bearing, or can be arranged in tandem, where tapered rollers 18 are aligned in parallel.

Roller bearings 10, 12 are pushed axially onto carrier shaft 8 and are spaced axially apart from each other by means of spacer sleeve 22 that rests against inner rings 14. In this respect carrier shaft 8 has axial bearing stop 24, which is formed on wheel bearing 2 at the vehicle side and against which the inner ring of inner roller bearing 10 axially abuts. Press ring 26 is fitted axially on the end of carrier shaft 8 that lies axially opposite axial bearing stop 24. Press ring 26 pushes inner ring 14 of outer roller bearing 12 axially against spacer sleeve 22, which, as a result, pushes in turn inner ring 14 of inner roller bearing 10 axially against axial bearing stop 24. In this way inner rings 14 of both roller bearings 10, 12 are held on carrier shaft 8 by press ring 26 in a rotationally rigid manner, but at least axially, on said carrier shaft.

Carrier shaft 8 has axial passage 28, through which rigid axle 4 is axially guided. Rigid axle 4 tapers off radially in the area of rigid axle 4 that is routed through axial passage 28, so that rigid axle 4 has axial shaft stop 30, against which carrier shaft 8 axially abuts. Carrier shaft 8 can be pushed axially against axial shaft stop 30 by means of nut 34 that is screwed onto thread 32 that is formed on the axial end of the rigid axle, so that carrier shaft 8 is held anti-rotationally, but at least axially, on rigid axle 4. Nut 34 is discussed in greater detail below.

Wheel hub 6 is mounted radially on outer rings 16 of roller bearings 10, 12. Wheel hub 6 has flange 36 for the attachment of a brake disk that is not depicted. For this attachment of the brake disk flange 36 has corresponding mounting holes 38. Additional mounting holes 40 are formed axially on the front face of wheel hub 6 on the side facing away from the vehicle. A wheel, which is not illustrated, can be fastened at wheel hub 6 by means of said mounting holes. Furthermore, wheel hub 6 has inner radial projection 42, against which inner roller bearing 10 rests in such a way that inner roller bearing 10 is axially accommodated between bearing stop 24 and inner radial projection 42. Similarly, wheel hub 6 has outer radial projection 44, against which outer roller bearing 12 rests in such a way that it is axially accommodated between collar 26 and outer radial projection 44. Outer rings 16 of two roller bearings 10, 12 can be pushed axially apart in a defined way over an axial distance between two radial projections 42, 44, so that outer rings 16 push axially against inner rings 14 due to the fixed axial position of inner rings 14 on carrier shaft 18 and, in so doing, exert a slight pre-stress on tapered rollers 18 between inner rings 14 and outer rings 16. In order to be able to save material, space 48, formed axially between two radial projections 42, 44, can remain without material. In order to prevent any lubricant from entering into this space 48 from roller bearings 10, 12, guard rings 50, which hold the lubricant in roller bearings 10, 12, are clamped axially between outer rings 16 of roller bearings 10, 12 and their corresponding radial projections 42, 44. On the wheel side cartridge seal 52, which prevents the lubricant from issuing from inner roller bearing 10 on the vehicle side, is arranged radially between wheel hub 6 and bearing stop 24 of carrier shaft 8. Similarly, on the side facing away from the vehicle there is cartridge seal 54 arranged between the outer ring of outer roller bearing 12 and wheel hub 6. This cartridge seal prevents the lubricant from exiting on the side of wheel bearing 2 that faces away from the vehicle.

In illustrated wheel bearing 2, inner rings 14 of roller bearings 10, 12 can be held stationary in the axial direction with a high clamping tension on carrier shaft 8 by means of spacer sleeve 22. In contrast, an exact dimensioning of two radial projections 42, 44 allows the pressure of outer rings 16 against their corresponding inner rings 14 to be defined with exact precision and to be held on a permanent basis, so that a precise pre-stress can be set in roller bearings 10, 12. The pre-stress can be set as early as during the manufacture or rather construction of wheel bearing 2 and does not have to be adjusted with effort, only when the individual wheel bearing components are mounted on rigid axle 4 of the vehicle.

In order to protect the area of rigid axle 4 that is received in carrier shaft 8 against, for example, incoming fluid, rigid axle 4 has O sealing rings 56 that seal off the area of rigid axle 4 that is received in the carrier shaft from the surrounding area.

In order to manufacture wheel bearing 2, carrier shaft 8 is made available initially with axial bearing stop 24 and the axial passage. For press ring 26 that is to be mounted axially at a later point in time, the end of carrier shaft 8 that lies opposite axial bearing stop 24 is made axially so long that this end protrudes axially over wheel hub 6, when wheel hub 6 has been received. Then one of guard rings 50, inner roller bearing 10 and cartridge seal 52 are inserted into the vehicle sided opening of wheel hub 6 and pushed together with wheel hub 6 over carrier shaft 8 until inner roller bearing 10 hits, on the one hand, axial bearing stop 24 and, on the other hand, hits inner radial projection 42. In the next step, spacer sleeve 22 is pushed axially over carrier shaft 8 until the carrier shaft hits axially inner ring 14 of inner roller bearing 10. Thereafter, other guard ring 50 and outer roller bearing 12 are pushed axially over carrier shaft 8, until inner ring 14 of outer roller bearing 12 hits spacer sleeve 22. Finally press ring 26 is mounted axially on the aforementioned protruding axial end of carrier shaft 8 and is connected to said end in a force closed manner by, for example, a press fit, by material bonding by means of, for example, laser welding or in a positive locking manner by, for example, a screw connection. Some examples of the possible methods of connecting press ring 26 to carrier shaft 8 are discussed in detail below in conjunction with FIGS. 3a through 7b.

In order to connect finished wheel bearing 2 to rigid axle 4, the first step is to mount O sealing rings 56 on rigid axle 4 and then to push the wheel bearing axially over rigid axle 4 until wheel bearing 2 hits axially shaft stop 30. In the last step, wheel bearing 2 is axially secured on rigid axle 4 with nut 34.

Reference is made to FIG. 3a and FIG. 3b, which show in each case another embodiment of press ring 26 of FIG. 1.

In FIGS. 3a and 3b, the axial end of carrier shaft 8, on which press ring 26 is mounted, has internal thread 58 on the inside circumference of passage 28. Thread 32, which is designed as external thread 32, on rigid axle 4 extends axially into passage 28 of carrier shaft 8, so that carrier shaft 8 is screwed onto rigid axle 4 at this location.

The axial end of rigid axle 4 has axial groove 60, in which flexible click-in lug 62 is latched, in the area of external thread 32. In this way, the rotational movements between rigid axle 6 and carrier shaft 8 can be avoided, so that carrier shaft 8 cannot unscrew itself from rigid axle 4. Click-in lug 62 can be raised radially, for example, with a tool (not shown in greater detail) and lifted out of axial groove 60, thus, allowing rotational movements and, thus, screwing movements of carrier shaft 8 on rigid axle 4 for the purpose of assembling and disassembling wheel bearing 2 on rigid axle 4.

The outside circumference of the axial end of carrier shaft 8 has external thread 32, which corresponds to external thread 32 of rigid axle 4 and for the sake of a better understanding is provided with the same reference numeral as external thread 32 of rigid axle 4. However, both external threads 32 can have different forms, for example, in the closeness between turns, the pitch, etc.

Press ring 26 is screwed onto external thread 32 of carrier shaft 8. The inside circumference of this press ring has internal thread 58, which corresponds to internal thread 58 of carrier shaft 8. Furthermore, press ring 26 has axial groove 60, which corresponds to axial groove 60 on rigid axle 4. An additional click-in lug 62, which is formed on carrier shaft 8, engages with this axial groove 60 on press ring 26. In order to secure press ring 26 in different angular positions on carrier shaft 8, carrier shaft 8 has a plurality of click-in lugs in the circumferential direction. As an alternative or in addition, plurality of axial grooves 60 could also be formed in press ring 26 in the circumferential direction.

Similarly, there is the option that nut 34 could have one axial groove or plurality of axial grooves 60, with which click-in lug 62, formed on the carrier shaft 8, engages in each case correspondingly. Since the principle of this system matches the principle of the system at press ring 26, a detailed presentation shall be dispensed with for the sake of brevity.

Figure 4A:
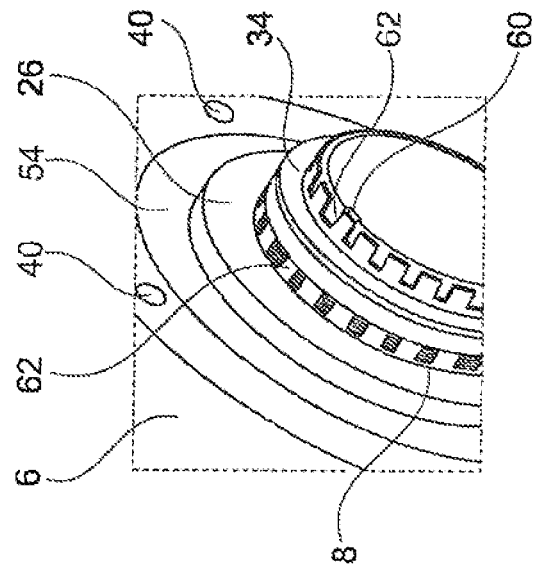
FIG. 4a is a cross-sectional view of another embodiment of the press ring of FIG. 1.
Figure 4B:
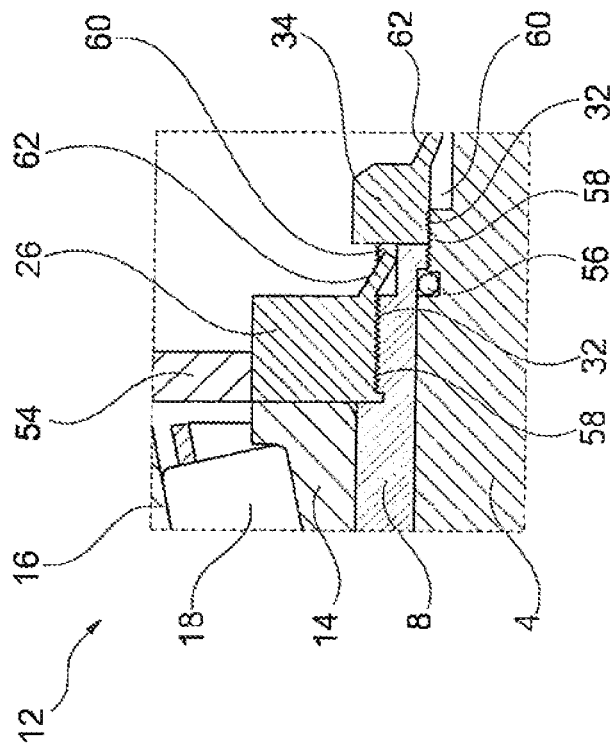

Reference is made to FIG. 4a and FIG. 4b, which show in each case another embodiment of press ring 26 of FIG. 1.

In FIGS. 4a and 4b click-in lug 62, which is formed on carrier shaft 8 in FIGS. 3a and 3b, is formed on press ring 26 and optionally also on nut 34. Axial grooves 60 are formed correspondingly in carrier shaft 8 and in rigid axle 4. In FIGS. 4a and 4b, axial grooves 60 and click-in lugs 62 are provided only once with a reference numeral for the sake of a better overview.

Moreover, the system works in the same way as the system depicted in FIGS. 3a and 3b.

Reference is made to FIG. 5a and FIG. 5b, which show in each case another embodiment of press ring 26 of FIG. 1.

In FIG. 5a and FIG. 5b, press ring 26 can be fitted on carrier shaft 8 by means of a press fit. The anti-rotational element of nut 34 is constructed in a manner analogous to that shown in FIGS. 4a and 4b.

Irrespective of whether press ring 26 is fitted on carrier shaft 8 by means of a press fit or not, nut 32 in the present embodiment can be axially clamped against first roller bearing 10 so as to support second roller bearing 12. This feature has the advantage that when press ring 26 is mounted on carrier shaft 8 by press fit and that when this press fit is slackened, then nut 32 acts like a fail-safe element, in that nut 32 represents for press ring 26 an axial stop, against which press ring 26 can abut, so that the axial clamping of first and the second roller bearings 10, 12 can be maintained at least as a precautionary measure.

Reference is made to FIG. 6a and FIG. 6b, which show in each case another embodiment of press ring 26 of FIG. 1.

In FIG. 6a and FIG. 6b press ring 26 can also be fitted on carrier shaft 8 by means of a press fit. In addition or as an alternative, press ring 26 can be axially secured by means of snap ring 64.

In the present embodiment, carrier shaft 8 is screwed onto rigid axle 4 without having to provide additional nut 32 for securing in the axial direction.

Figure 7B:
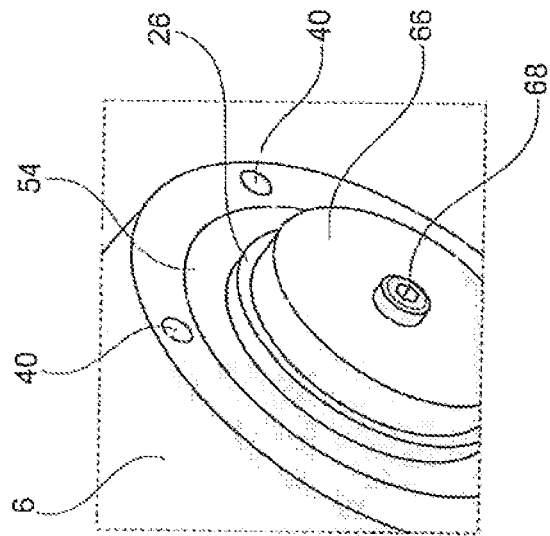
Figure 7A:
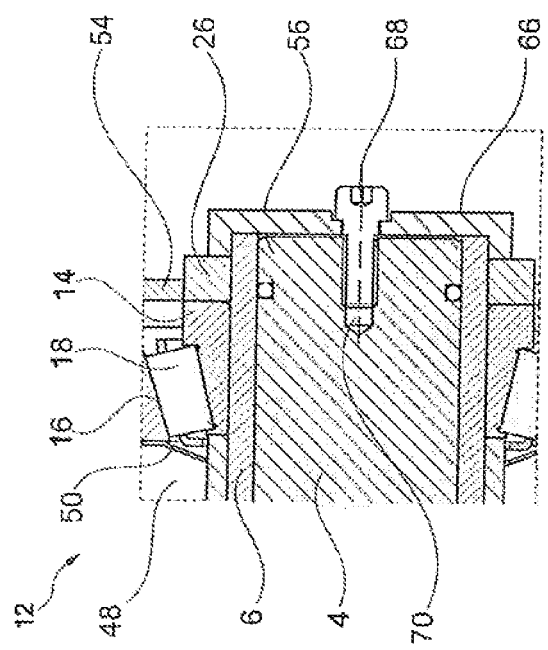

Reference is made to FIG. 7a and FIG. 7b, which show in each case another embodiment of press ring 26 of FIG. 1.

In FIG. 7a and FIG. 7b, press ring 26 can also be fitted on carrier shaft 8 by means of a press fit. In addition or as an alternative, press ring 26 can be axially secured by means of cover 66, which is screwed axially onto rigid axle 4. In this way cover 66 can be used for axially clamping two roller bearings 10, 12 by means of press ring 26 and for axially securing carrier shaft 8 on rigid axle 4.

In the present embodiment, cover 66 is axially secured with screw 68, which is screwed into corresponding mounting hole 70. However, this feature is just one example. Cover 66 can be secured on the rigid axle in any way, for example in a force closed and/or positive locking manner and/or by material bonding.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Numerals 2 wheel bearing
4 rigid axle
6 wheel hub
8 carrier shaft
10 roller bearing
12 roller bearing
14 inner ring
16 outer ring
18 tapered rollers
20 axis of rotation
22 spacer sleeve
24 bearing stop
26 collar
28 passage
30 shaft stop 32 thread
34 nut
36 flange
38 mounting hole
40 mounting hole
42 radial projection
44 radial projection
48 space
50 guard ring
52 cartridge seal
54 cartridge seal
56 O ring seal
58 internal thread
60 axial groove
62 click-in lug
64 snap ring
66 cover
68 screw
70 mounting hole

What is claimed is:

1. A utility vehicle comprising:
a frame with a rigid axle, the rigid axle including a first axial groove in a radially outer surface of the rigid axle;
a wheel; and,
a wheel bearing comprising,
 a sleeve-shaped carrier shaft, in which the rigid axle of the utility vehicle is received in a concentric manner, the sleeve-shaped carrier shaft including:
  a first radially outermost surface with a first plurality of threads;
  a first lug extending radially inward into the first axial groove; and,
  a second lug extending radially outward;
 a wheel hub;
 a first roller bearing and a second roller bearing for rolling the wheel hub relative to the carrier shaft; and,
 a press ring including:
  a radially innermost surface with a second plurality of threads engaged with the first plurality of threads to axially clamp the first and second roller bearings on the sleeve-shaped carrier shaft;
  a second radially outermost surface; and,
  a second axial groove in the second radially outermost surface, wherein:
 the second roller bearing is clamped axially against the first roller bearing on the sleeve-shaped carrier shaft by means of the press ring; and,
 a portion of the second lug is disposed in the second axial groove.

2. The utility vehicle as recited in claim 1, wherein the carrier shaft is axially secured on the axle by means of a securing element that protrudes at least partially radially over the press ring.

* * * * *